(12) United States Patent
Menino Pizarro

(10) Patent No.: US 9,782,855 B2
(45) Date of Patent: Oct. 10, 2017

(54) PROTECTIVE STRUCTURE FOR TABLES AND OPTICAL TABLE COMPRISING SAID PROTECTIVE STRUCTURE

(71) Applicant: Fundació Institut de Ciències Fotòniques, Barcelona (ES)

(72) Inventor: Xavier Menino Pizarro, Barcelona (ES)

(73) Assignee: Fundació Institut de Ciències Fotòniques, Barcelona (ES)

( * ) Notice: Subject to any disclaimer, the term of this patent is extended or adjusted under 35 U.S.C. 154(b) by 0 days.

(21) Appl. No.: 13/915,051

(22) Filed: Jun. 11, 2013

(65) Prior Publication Data

US 2014/0360110 A1    Dec. 11, 2014

(51) Int. Cl.
B23K 26/70    (2014.01)

(52) U.S. Cl.
CPC .................. *B23K 26/706* (2015.10)

(58) Field of Classification Search
CPC ............ B10L 9/02; B25H 1/20; B23K 26/706
USPC .......... 52/27, 36.1, 36.2, 36.4, 127.7, 173.1; 74/16; 248/637, 639, 646, 672, 678; 312/209, 223.1, 223.2, 223.3
See application file for complete search history.

(56) References Cited

U.S. PATENT DOCUMENTS

| | | | |
|---|---|---|---|
| 4,283,847 A * | 8/1981 | May ................................ 29/832 |
| 5,410,119 A * | 4/1995 | Lehmann .................... 219/69.12 |
| 5,748,656 A * | 5/1998 | Watson et al. .................. 372/35 |
| 5,863,017 A * | 1/1999 | Larson ...................... G02B 7/00 248/176.1 |
| 6,095,482 A * | 8/2000 | LaGrotta et al. ............. 248/672 |
| 7,527,155 B2 * | 5/2009 | McClain ................. G06F 1/181 211/126.2 |
| 7,634,967 B1 * | 12/2009 | Albright et al. ........... 108/50.02 |
| 7,672,344 B2 * | 3/2010 | Sung ................................ 372/24 |
| 7,874,244 B2 * | 1/2011 | Rhome ........................ 99/323.5 |
| 8,464,634 B2 * | 6/2013 | Cretors ................. A23L 1/1815 99/323.5 |
| 2002/0021502 A1 * | 2/2002 | Davies ................... G01M 11/04 359/811 |
| 2002/0108857 A1 * | 8/2002 | Paschetto et al. ........... 204/457 |
| 2003/0058917 A1 * | 3/2003 | Benderly ............. B23K 26/066 372/103 |
| 2003/0102008 A1 * | 6/2003 | Sandhu et al. ................. 134/1.3 |
| 2004/0003545 A1 * | 1/2004 | Gillespie ........................ 52/36.1 |
| 2005/0030648 A1 * | 2/2005 | Yamaguchi et al. .......... 359/819 |
| 2007/0252977 A1 * | 11/2007 | Baran et al. ............... 356/239.7 |
| 2008/0158569 A1 * | 7/2008 | Maehner ............. G01M 17/027 356/458 |
| 2008/0279232 A1 * | 11/2008 | Sung .................. B23K 26/0604 372/24 |
| 2009/0145050 A1 * | 6/2009 | Dugand ........................ 52/36.1 |

(Continued)

*Primary Examiner* — Joshua J Michener
*Assistant Examiner* — Theodore Adamos
(74) *Attorney, Agent, or Firm* — Kramer Levin Naftalis & Frankel LLP

(57) ABSTRACT

A protective structure for tables comprises an external frame placed around the table defining a security distance between the external frame and the table, and the protective structure further comprises protecting means including at least one beam blocker, said at least one beam blocker being preferably placed vertically on said external frame. The protective structure permits isolation of the optical table from vibrations, heat and/or air flow produced by other equipment used during the experiments.

18 Claims, 2 Drawing Sheets

(56) References Cited

U.S. PATENT DOCUMENTS

2010/0107781 A1* 5/2010 Sakaguchi ............ G01N 21/05
                                                73/863.03
2011/0032587 A1* 2/2011 Bjelkhagen et al. ........... 359/23
2011/0234061 A1* 9/2011 DeLoach ...................... 312/209
2013/0186003 A1* 7/2013 Anderson .............. G01M 11/04
                                                  49/367

* cited by examiner

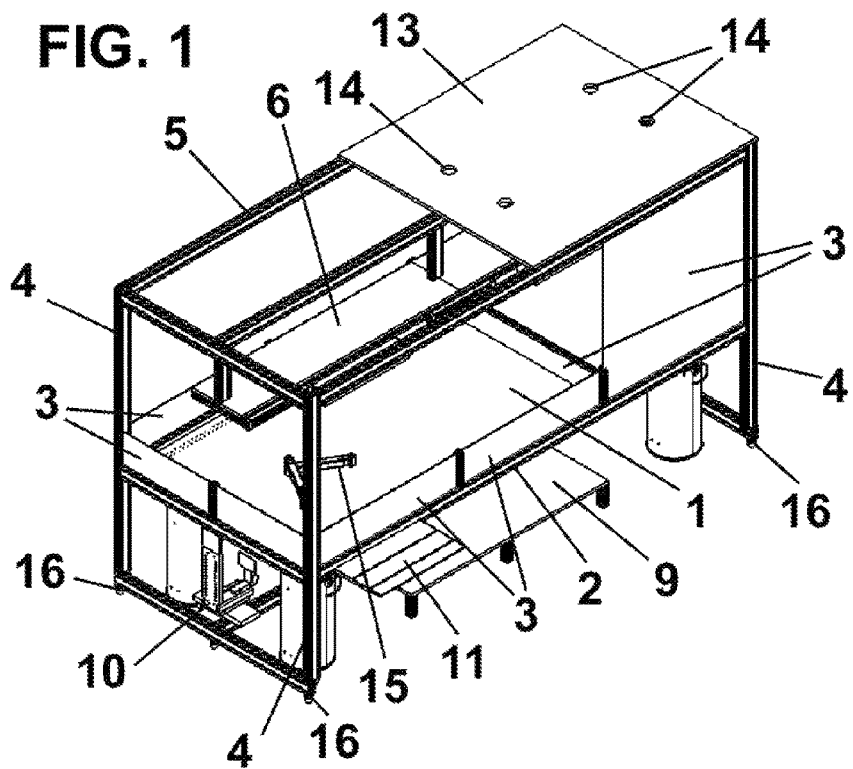
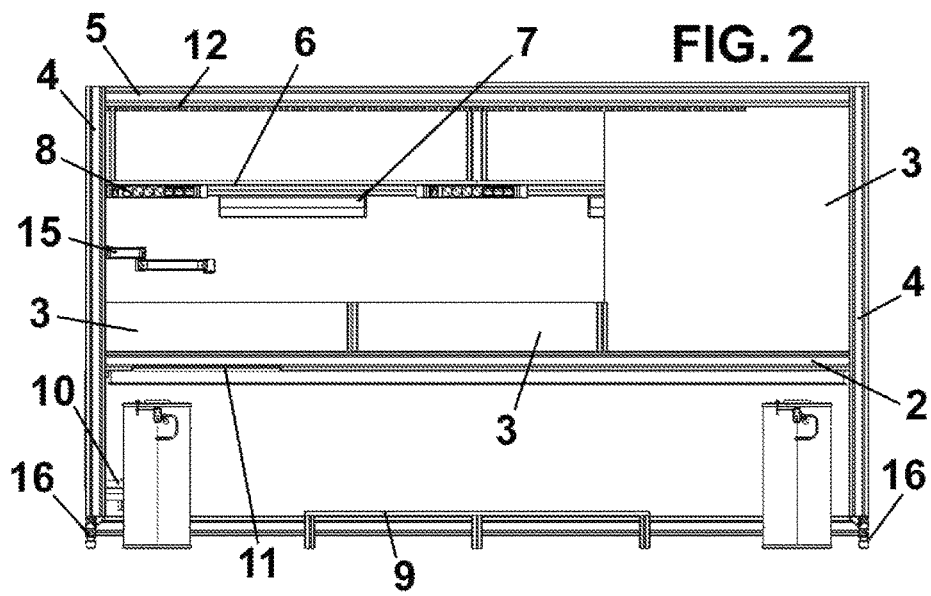

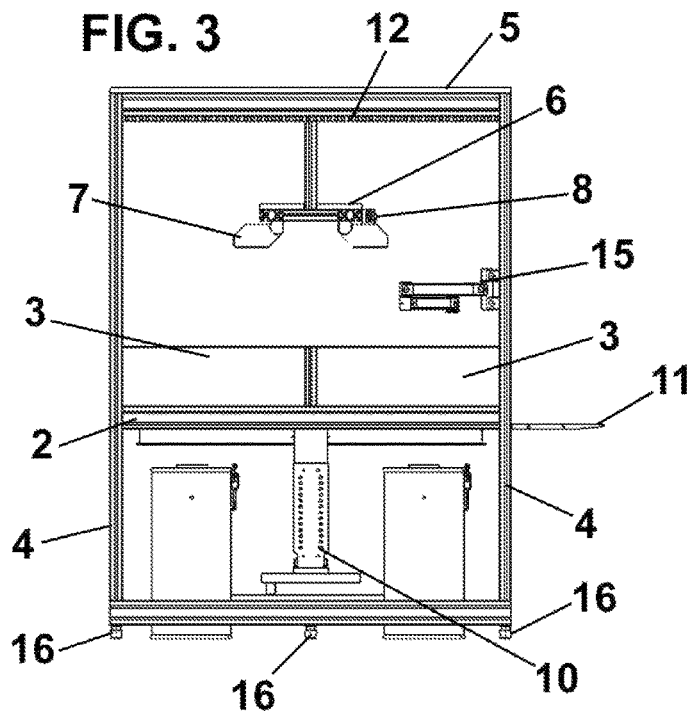
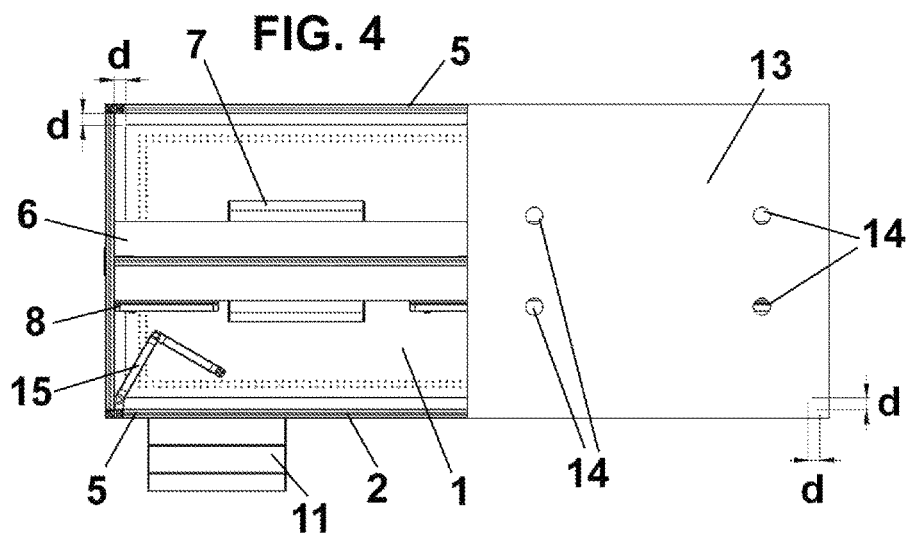

PROTECTIVE STRUCTURE FOR TABLES AND OPTICAL TABLE COMPRISING SAID PROTECTIVE STRUCTURE

The present invention refers to a protective structure for tables, and to an optical table comprising said protecting structure, e.g. against laser beams that can be produced during assays done on said optical table.

BACKGROUND OF THE INVENTION

The optical tables are used in laboratories, and they are platforms that are used to support systems for optic experiments. Because optics often demands vibrations, the optical tables are usually very heavy and their surface is typically made from stainless steel.

These optical tables need some kind of protection against the beams produced during the optic experiments, because the beams, e.g. laser beams, can damage the users of the laboratory.

This protection against the beams in the current optical tables is usually made from vertical aluminum plates fixed directly to the table. This protecting means consisting in aluminum plates have several drawbacks.

For example, the main drawback of these aluminum plates is that they cannot be easily fixed to the table, which increases the cost of the optical table.

Another drawback of the optical tables currently known is that they do not provide a specific place for devices or computers, so that they must be placed in positions where they can disturb the optic experiments.

Therefore, it is clear that there is a need for an optic table which solves said drawbacks, i.e. an optic table that can be easily protected from beams and that can provide specific places for devices, computers or the like.

DESCRIPTION OF THE INVENTION

With the protective structure and the optical table of the invention said drawbacks can be solved, presenting other advantages that will be described hereinafter.

The protective structure for tables according to the invention comprises an external frame placed around the table defining a security distance between the external frame and the table.

Said protective structure for tables advantageously comprises protecting means including at least one beam blocker.

According to a preferred embodiment, said at least one beam blocker is placed vertically on said external frame, and said protecting means can comprise a plurality of beam blockers.

Said beam blocker or blockers can be made from black anodized aluminum or resin-bonded cellulose laminate.

Preferably, the protective structure for tables according to the invention also comprises vertical profiles at least at the corners of said external frame, and said at least one beam blocker can be attached at different heights to said vertical profiles.

According to a preferred embodiment, the protective structure for tables according to the invention also comprises an upper frame supported by said vertical profiles.

If necessary, said at least one beam blocker can cover the whole height from the external frame to the upper frame.

Advantageously, said upper frame can comprise at least one upper shelve, and said upper shelve can comprise lighting and/or sockets.

Furthermore, said external frame can comprise at least one lower shelve, at least one shelve for a keyboard and/or at least one holder for a computer.

At least one of said vertical profiles can also comprise a holder for a screen, and advantageously, said upper frame can comprise at least one support for a drape.

According to one embodiment, said upper frame can comprises an upper cover, which covers partially or completely said upper frame, and advantageously said upper cover comprises a plurality of holes.

Also advantageously, the external frame and/or upper frame are made from assembled metallic profiles, and preferably said metallic profiles are extruded aluminum profiles.

Said vertical profiles can also comprise adjustable anti-vibration feet.

According to a second aspect, the present invention also refers to an optical table a protective structure as described previously.

With the protective structure and the optical table according to the invention the following advantages can be obtained:

The beam blockers can be fixed easily at the external frame and they can be placed in a suitable position for protecting the users;

It is modular, so that the external frame can be adapted to any platform, and it can be assembled easily, and it is recyclable;

It provides specific places to place devices, computers, etc. and also an integrated lighting system and sockets for electric power; and It permits to isolate the optical table from vibrations, heat and/or air flow produced by other equipment used during the experiments.

BRIEF DESCRIPTION OF THE DRAWINGS

For a better comprehension of what has been shown, some drawings are attached in which, diagrammatically and only as a non-limitative example, a practical embodiment is shown.

FIG. 1 is a perspective view of the optical table including a protective structure according to the present invention;

FIG. 2 is a frontal elevation view of the optical table including a protective structure according to the present invention;

FIG. 3 is a side elevation view of the optical table including a protective structure according to the present invention; and FIG. 4 is a plan view of the optical table including a protective structure according to the present invention.

DESCRIPTION OF A PREFERRED EMBODIMENT

An optical table comprising a protective structure according to the invention is shown in the drawings. The protective structure comprises an external frame 2 placed around an optical table 1 and defining a security distance (indicated by letter d in FIG. 4) between the optical table 1 and the external frame 2.

Said external frame 2 is made from metallic profiled assembled to each other, e.g. extruded aluminum profiles, and it comprises at least one beam blocker 3 to protect the users from the beams, e.g. laser beams, produced by experiments carried out at the platform. Preferably, as shown in the drawings, there are several beam blockers 3 that can cover all the perimeter of the platform 1.

Said one or each beam blocker 3 is placed vertically, i.e. forming substantially 90° with the surface of the optical table 1, and said or each beam blocker 3.

Said or each beam blocker 3 is preferably made from black anodized aluminum or resin-bonded cellulose laminate, even though it or they can be made from any suitable material.

The protective structure according to the present invention also comprises vertical profiles 4 or columns for supporting an upper frame 5. Said upper frame 5 is used for placing at least one upper shelve 6, that can comprise lights 7 and sockets 8 for electric connection. The upper shelve 6 is for placing any kind of device. Furthermore, said vertical profiles 4 comprise adjustable anti-vibration feet 16.

Each beam blocker 3 can be attached to these vertical profiles 4 at any height and, if necessary, as some or all the beam blockers 3 can cover the whole height between the external frame 2 and the upper frame 5. In the case that all the beam blockers 3 cover the whole height between said external frame 2 and said upper frame 5, then a called "black box" can be created.

This upper frame 5 can also comprise at least one support 12 for a drape and an upper cover 13, which can cover partially or completely said upper frame 5. This upper cover 13 preferably comprises through holes 14 for the passage of cables.

The protective structure according to the present invention also comprises a lower shelve 9, also for placing any kind of device, and one or more holders 10, e.g. for computers, a shelve 11 for a keyboard, and a support 15 for a computer screen.

As all the components of the protective structure of the present invention are made from modular profiles, these components can be assembled easily and they can be adapted to the dimensions of the optical table 1 or to the needs of the laboratory.

Even though reference is made to a specific embodiment of the invention, it is clear for a person skilled in the art that the disclosed protective structure is susceptible of numerous variations and modifications, and that all the details cited can be substituted by other technically equivalent ones, without departing from the scope of protection defined by the attached claims.

The invention claimed is:

1. A protective structure for a table, the table having a surface for supporting at least one system used to conduct optic operations, said protective structure comprising:
    an upper frame;
    an external frame that includes profiles assembled to each other and placeable peripherally around sides of said table, said external frame being orientable substantially horizontally to align with said surface of said table when said surface of said table is positioned in a substantially horizontal manner, and placeable around the sides of the table so as to define a peripheral security distance between an inner perimeter surface of the external frame and an outer edge of the table, the peripheral security distance isolating the table from one or more of vibrations, heat, and air flow produced by external equipment used during the optic operations, the profiles including vertical portions disposable proximate at least two corners of the table such that the vertical portions extend above the table to support the upper frame and below the table to support the external frame upon a substantially horizontal surface when the external frame is placed around the sides of the table; and
    a plurality of beam blockers disposed on and along at least one of the profiles of the external frame, a first portion of the plurality of beam blockers covering a height extending from the external frame to the upper frame and a second portion of the plurality of beam blockers comprising an upper end terminating at a position between the external frame and the upper frame and positioned along the perimeter of the table when the external frame is placed around the sides of the table, wherein configuration of the external frame and the plurality of beam blockers, without fully covering the table, substantially prevents hazardous beams produced during the optic operations from traversing beyond the periphery of the external frame.

2. The protective structure according to claim 1, wherein said plurality of beam blockers are disposable vertically on said external frame.

3. The protective structure according to claim 1, wherein said plurality of beam blockers are made from black anodized aluminum or resin-bonded cellulose laminate.

4. The protective structure according to claim 1, wherein at least one of said plurality of beam blockers is attachable at different heights to said profiles.

5. The protective structure according to claim 1, wherein said upper frame comprises at least one upper shelf.

6. The protective structure according to claim 5, wherein said upper shelf comprises at least one of lighting or sockets.

7. The protective structure according to claim 1, wherein said external frame comprises at least one lower shelf.

8. The protective structure according to claim 1, wherein said external frame comprises at least one shelf for a keyboard.

9. The protective structure according to claim 1, wherein said external frame comprises at least one holder for a computer.

10. The protective structure according to claim 1, wherein at least one of said vertical portions of the profiles comprises a holder for a screen.

11. The protective structure according to claim 1, wherein said upper frame comprises at least one support for a drape.

12. The protective structure according to claim 1, wherein said upper frame comprises an upper cover partially or completely covering said upper frame.

13. The protective structure according to claim 12, wherein said upper cover comprises a plurality of holes defined thereon.

14. The protective structure according to claim 1, wherein at least one of said external frame and said upper frame is made from assembled metallic profiles.

15. The protective structure according to claim 14, wherein said metallic profiles are extruded aluminum profiles.

16. The protective structure according to claim 1, wherein said vertical portions of the profiles comprise adjustable anti-vibration feet.

17. An optical table comprising the protective structure according to claim 1.

18. A table, comprising:
    a surface for supporting at least one system used to conduct optic operations; and
    a protective structure having an external frame, an upper frame, and a plurality of beam blockers, the external frame (i) including profiles assembled to each other, the profiles including vertical portions disposed proximate at least two corners of the table such that the vertical portions extend above the table to support the upper frame and below the table to support the external frame upon a substantially horizontal surface, (ii) being oriented substantially horizontally to align with the surface of the table when the surface of the table is positioned in a substantially horizontal manner, and (iii) placed around sides of the table so as to define a peripheral security distance between an inner perimeter surface of the external frame and an outer edge of the table, the peripheral security distance isolating the table from one or more of vibrations, heat, and air flow produced by external equipment used during the optic operations, the plurality of beam blockers being disposed on and along at least one of the profiles of the external frame, a first portion of the plurality of beam blockers covering a height extending from the external frame to the upper frame and a second portion of the plurality of beam blockers comprising an upper end terminating at a position between the external frame and the upper frame and positioned along the perimeter of the table, wherein configuration of the external frame and the plurality of beam blockers, without fully covering the table, substantially prevents hazardous beams produced during the optic operations from traversing beyond the periphery of the external frame.

* * * * *